Oct. 6, 1925.    1,556,402
E. F. BEGTRUP
METHOD OF AND APPARATUS FOR WELDING RAILS
Filed Aug. 22, 1922    2 Sheets-Sheet 1
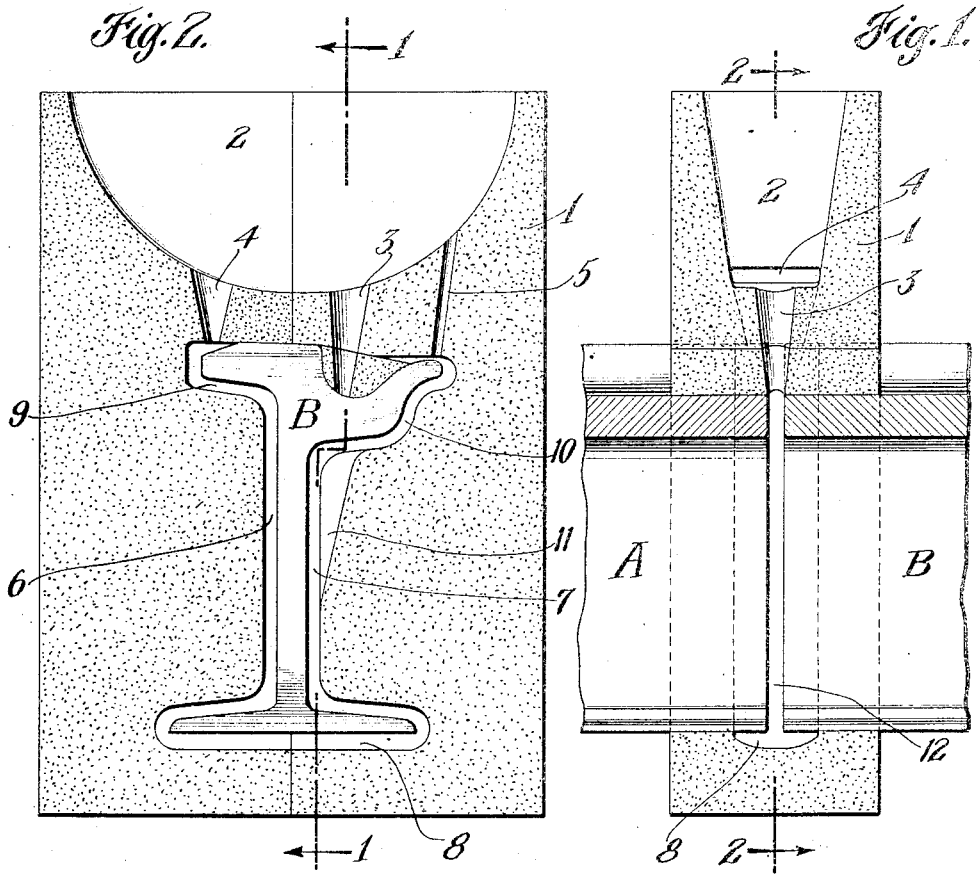
Inventor
E. F. Begtrup
By his Attorney Oct. 6, 1925.

E. F. BEGTRUP

METHOD OF AND APPARATUS FOR WELDING RAILS

Filed Aug. 22, 1922 2 Sheets-Sheet 2

Inventor
E. F. Begtrup
By his Attorney

Patented Oct. 6, 1925.

1,556,402

UNITED STATES PATENT OFFICE.

EDWARD F. BEGTRUP, OF JERSEY CITY, NEW JERSEY, ASSIGNOR TO METAL & THERMIT CORPORATION, OF CHROME, NEW JERSEY, A CORPORATION OF NEW JERSEY.

METHOD OF AND APPARATUS FOR WELDING RAILS.

Application filed August 22, 1922. Serial No. 583,511.

*To all whom it may concern:*

Be it known that I, EDWARD F. BEGTRUP, a citizen of the United States, and a resident of Jersey City, in the county of Hudson and State of New Jersey, have invented certain new and useful Improvements in Methods of and Apparatus for Welding Rails; and I do hereby declare the following to be a full, clear, and exact description of the invention, such as will enable others skilled in the art to which it appertains to make and use the same.

The invention relates to the method of and apparatus for forming sound homogeneous rail-joint welds, by means of a superheated fluid metal, such as "thermit," or molten steel brought to the necessary degree of superheat in an electric furnace. To this end the invention comprises enclosing the separate rail ends in a mold provided with a space to define the welding joint and having a pouring gate so arranged as to deliver the welding metal down through the mold, first, to the bottom thereof adjacent the rail bases, without substantial contact with other portions of the rails, and then in a continuous rising flow in the space between and about the rail ends. By this particular mode of casting the joint and the special arrangement of the mold cavity and the pouring gate the molten metal will be maintained substantially uniform in temperture during the casting operation and a sound homogeneous weld will be effected. While the invention is particularly advantageous as applied to welding the ends of girder rails and T-rails, such as are commonly employed in street railways, it will be understood that it is equally as effective in producing sound and uniform welds between the ends of other similar metallic shapes of irregular cross-section.

In the ordinary mode of making rail welds by means of thermit or other highly heated metal the rails are aligned end to end with a space intervening between the ends and surrounded with a refractory mold having a joint-defining cavity therein which is filled with superheated liquid steel. The hot liquid metal which surrounds the rail ends increases the temperature of the rails to such a degree as to cause, upon cooling, a coalescence or welding together of the metal of the rail ends with the poured metal. In forming welded joints of this character it is important to have all parts of the rail ends brought to a sufficiently high temperature to cause fusion, and it is also vitally important that this high degree of temperature of the rail ends be effected substantially simultaneously and uniformly throughout the entire sections of the rails being welded. According to the general method of making rail-joints it has been practically impossible to obtain this simultaneous and uniform heating of the rail ends, and to partially correct this difficulty an excess of fluid metal has usually been employed. The objections inherent in the former methods are due largely to the fact that the superheated molten metal is first brought into contact with portions of the rail ends more or less remote from the ultimate place of deposit of the particular portion of the molten metal, with the result that the latter is chilled, and, therefore, a uniform distribution of the molten metal about the rail ends cannot be effected and the welded joint will lack uniformity. These conditions are brought about by the particular mode of pouring and delivering the molten metal into the mold cavity, so that the initial portions of the pour come into contact with portions of the rail other than those with which said initial portions are ultimately to unite. To overcome these difficulties and to effect sound homogeneous welds of the character indicated, the joint is formed in a mold provided with means for delivering the initial and successive portions of the superheated metal directly to the positions in the mold which they are to ultimately occupy in the finished welded joint, so that the temperature of the molten metal may be maintained substantially uniform throughout the welding operation and the ends of the rails will be correspondingly uniformly heated.

Means for carrying out the invention are illustrated in the accompanying drawings in which:—

Fig. 1 is a sectional elevation of the ends of two girder rails with a mold embodying my invention applied thereto, the section being taken on the line 1—1 of Fig. 2.

Fig. 2 is a section taken on the line 2—2 of Fig. 1.

Fig. 3 is a plan view of the mold and rail ends.

Figure 5:
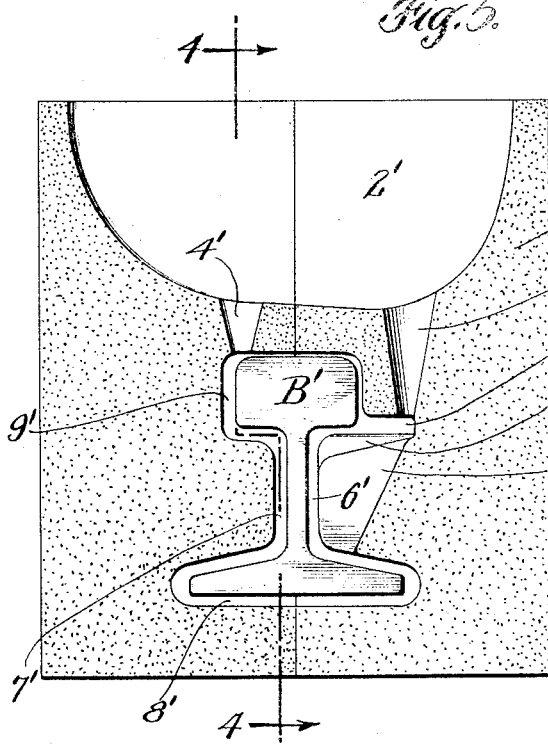
Fig. 5 is a section taken on the line 5—5 of Fig. 4.
Figure 4:
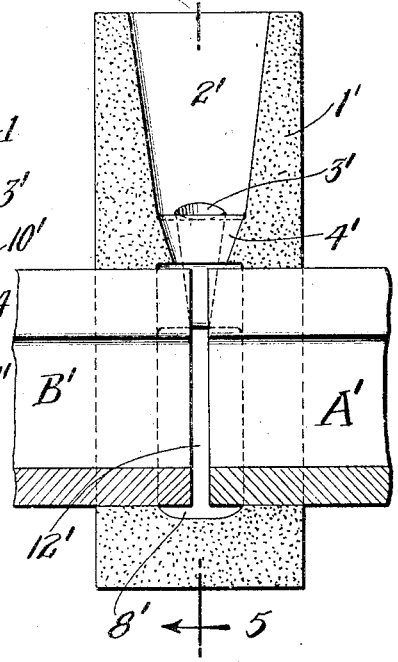
Fig. 4 is a view in sectional elevation similar to Fig. 1, showing a mold for joining T-rails, the section being taken on the line 4—4 of Fig. 5.
Figure 6:
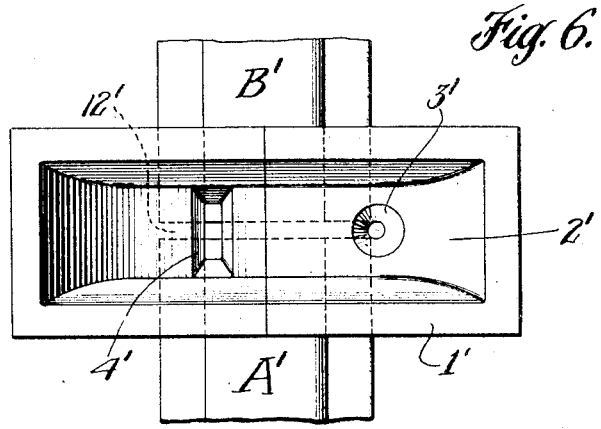
Fig. 6 is a plan view thereof.

Referring to Figs. 1 to 3 of the drawings, 1 indicates a mold of refractory material adapted to be placed about the adjacent ends of the rails A, B, which are of the girder type and separated by a definite space. The rail ends are surrounded by a casting space which includes and embraces the base of the rail, as at 8, the web of the rail, as at 6 and 7, the lower surface and lateral edge of the tread section, as at 9, and similarly the lower and lateral faces of the lip section, as at 10, these interconnected spaces together with the space 12 between the adjacent ends of the rails defining the body of cast metal which effects the joint between the rail ends. In constructing molds of this general character heretofore, it has been the practice to provide the same with a pouring gate located approximately at one side of the mold and either communicating with the top of the mold cavity adjacent the head section of the rail, or extending down through the body of the mold and communicating with the bottom of the cavity adjacent the base portions of the rails. Such an arrangement resulted in the first portion of the pour of liquid metal becoming cooled by contact with the comparatively cool parts of the rail heads or bases, according to whether the initial part of the pour entered at the top or bottom of the mold cavity. When the hot metal enters the top of the mold cavity it is still further cooled in its downward course by coming in contact with the web section of the rail, so that upon its arrival at its ultimate resting place surrounding the base at 8, the temperature of this initial portion of molten metal has dropped very considerably. Furthermore, in this prior practice, as the mold fills with molten steel, the last steel entering through the pouring gate must pass by the lip or the tread section of the head to reach the cavity on the opposite side, depending upon whether the pouring gate is located over the tread or the lip section, which results in chilling the molten steel that is ultimately to surround the rail section on the side opposite the location of the pouring gate. The first portion of the poured metal having been chilled to a greater extent than the final portion of the pour there is produced an unequal heating of the rail ends which prevents uniform fusion thereof and precludes uniform solidification and contraction, with the result that the finished joint is not homogeneous. The same conditions maintain in somewhat more aggravated form when the pouring gate connects by a runner directly with the bottom of the mold cavity 8 surrounding the bases of the rail section, as in this case the molten metal which is to ultimately surround the head section first engages the base section and gradually rises along the web, so that by the time it reaches the head it has been materially decreased in temperature, and even greater imperfections, due to lack of uniform fusion, solidification and contraction, result. The present invention effectively overcomes these difficulties by so locating the pouring gate 3 as to deliver the molten metal directly to the base section 8 of the mold without coming in contact with any intermediate portions of the rail sections. To this end the pouring gate 3, formed in the base of the reservoir 2, is preferably located immediately over the space 12 between the rail ends and intermediate the outer edges of the lip and tread of the rail, so that the first portion of the molten steel entering the mold cavity will drop through the space 12 and reach the cavity 8 surrounding the base without having been previously cooled by contact with either the head or web sections. Subsequent portions of the molten metal will gradually rise and fill the sections 6 and 7 adjacent the web and, when the level of the molten metal reaches the bottom of the head section, the metal will flow laterally or transversely to fill up the sections 9 and 10 of the mold cavity, and the entire mass of the molten metal will be maintained at a substantially uniform temperature, which will effect a uniform fusion of the rail ends and a corresponding solidification and contraction upon cooling, the ultimate portions of the pour passing upwardly through the vents or risers 4 and 5. If the space 7 adjacent the web of the rail and directly under the pouring gate 3 is not approximately in line vertically with the pouring gate, or is not sufficiently large to prevent the entering stream coming in contact with the web section, a pouring fin 11 may be formed in the mold between the sections 10 and 7 of the cavity, as illustrated.

In welding ordinary T-rails, according to the present invention, the mold 1', of refractory material, is provided with a cavity comprising a base section 8', web sections 6' and 7', a head section 9', and a shallow chamber 10' immediately below and communicating with the pouring gate 3', which is preferably located at one side of the head, the bottom 14 of the chamber 10' preferably converging into a relatively narrow pouring fin 11' located below the pouring gate, the bottom edge of said fin terminating at a point approximately adjacent the intersection of the base and web of the rail sections. The fin 11' is made comparatively narrow to economize in metal and also to effect the retardation of the momentum of the metal entering the mold cavity at the pouring gate.

In this case it will be seen that the first metal entering the gate 3' flows through the chamber 10' along fin 11' and reaches its ultimate resting place in the cavity 8' surrounding the base portions of the rail ends without having been cooled or chilled by contact with any other part of the rail sections. Similarly the succeeding portions of the fluid metal will rise about and between the web sections of the rails without contacting any other portion of the rails and the last portion entering the mold will flow transversely across the head section until it fills the cavity sections 9' and 10' and the vent or riser 4'. Due to the retardation of the flow, effected by the shallow chamber 10' and the narrow fin 11', this last increment of the fluid metal will have less momentum and consequently will flow or wash across the intervening space between the heavy head sections of the rails and effect a thorough and complete fusion of the metal of the rails at this point with a consequent sound and homogeneous joint between the cast metal and the rail ends throughout the entire extent of the latter. It will be noted that the walls of the mold cavity follow the general contour of the rails, with a relatively narrow space between the walls and the surface of the rails, as the amount of metal required by the present invention to produce effective joints is reduced to a minimum.

From the foregoing description it will be seen that a uniform distribution of the molten metal at substantially uniform temperature throughout the entire pouring operation is effected, and, as a result, the union between the cast metal and the rail ends is uniform and homogeneous throughout.

What I claim is:

1. The method of forming sound homogeneous rail joint welds, which comprises enclosing the ends of the rails to be welded in a mold provided with a space to define the welding joint including a space between the ends of the rails, providing a pouring gate so positioned and communicating with the joint defining space as to deliver the welding metal first to the space surrounding the base of the rails without contacting with other portions of the rails and finally to cause the metal to flow transversely around and between the upper portions of the rails, and pouring a molten metal into said mold to fill the space therein.

2. A mold for forming sound homogeneous rail joint welds comprising a joint defining space or cavity surrounding and separating the rail ends and a pouring gate so positioned in the mold as to deliver the molten metal first to the space surrounding the base portions of the rails without contacting with other portions of the rails and the successive portions of the metal into the space between and surrounding the upper portions of the rail ends.

3. A mold for forming sound homogeneous rail joint welds comprising a joint defining space or cavity surrounding and separating the rail ends, a pouring gate so positioned in the mold as to deliver the molten metal first to the space surrounding the base portions of the rails without contacting with other portions of the rails and the successive portions of the metal into the space between and surrounding the upper portions of the rail ends, and means to retard the momentum of the metal entering the mold.

4. A mold for forming sound homogeneous rail joint welds comprising a joint defining space or cavity surrounding and separating the rail ends, and a pouring gate so positioned in the mold as to deliver the molten metal to the space surrounding the base portions of the rails without having first come into contact with other portions of the rails.

5. A mold for forming sound homogeneous rail joint welds comprising a joint defining space or cavity surrounding and separating the rail ends, and a pouring gate so positioned in the mold as to deliver the molten metal into the latter in such manner that the last metal entering the mold will flow in substantially equal parts, one part toward one side of the rail top and the other part toward the opposite side of the rail top.

6. A mold for forming sound homogeneous rail joint welds comprising a joint defining space or cavity surrounding and separating the rail ends, and a pouring gate so positioned that each unit part of the molten metal entering the mold will reach its ultimate resting place about the rail ends without substantially having previously come into contact with any other part of the rail ends.

7. The method of forming sound homogeneous rail joint welds, which comprises enclosing the ends of the rails to be welded in a mold provided with a space to define the welding joint including a space between the ends of the rails the space defining walls of said mold having the general contour of the enclosed rails and being separated from the rail surfaces by relatively narrow spaces, providing a pouring gate so positioned and communicating with the joint defining space as to deliver the welding metal first to the space surrounding the base of the rails without contacting with other portions of the rails and finally to cause the metal to flow transversely around and between the upper portions of the rails, and pouring a molten metal into said mold to fill the space therein.

8. A mold for forming sound homogeneous rail joint welds comprising a joint defining space or cavity surrounding and separating the rail ends the space defining walls of said mold having the general contour of the enclosed rails and being separated from the rail surfaces by relatively narrow spaces, and a pouring gate so positioned in the mold as to deliver the molten metal first to the space surrounding the base portions of the rails without contacting with other portions of the rails and the successive portions of the metal into the space between and surrounding the upper portions of the rail ends.

9. A mold for forming sound homogeneous rail joint welds comprising a joint defining space or cavity surrounding and separating the rail ends the space defining walls of said mold having the general contour of the enclosed rails and being separated from the rail surfaces by relatively narrow spaces, a pouring gate so positioned in the mold as to deliver the molten metal first to the space surrounding the base portions of the rails without contacting with other portions of the rails and the successive portions of the metal into the space between and surrounding the upper portions of the rail ends, and means to retard the momentum of the metal entering the mold.

10. A mold for forming sound homogeneous rail joint welds comprising a joint defining space or cavity surrounding and separating the rail ends the space defining walls of said mold having the general contour of the enclosed rails and being separated from the rail surfaces by relatively narrow spaces, and a pouring gate so positioned in the mold as to deliver the molten metal to the space surrounding the base portions of the rails without having first come into contact with other portions of the rails.

11. A mold for forming sound homogeneous rail joint welds comprising a joint defining space or cavity surrounding and separating the rail ends the space defining walls of said mold having the general contour of the enclosed rails and being separated from the rail surfaces by relatively narrow spaces, and a pouring gate so positioned in the mold as to deliver the molten metal into the latter in such manner that the last metal entering the mold will flow in substantially equal parts, one part toward one side of the rail top and the other part toward the opposite side of the rail top.

12. A mold for forming sound homogeneous rail joint welds comprising a joint defining space or cavity surrounding and separating the rail ends the space defining walls of said mold having the general contour of the enclosed rails and being separated from the rail surfaces by relatively narrow spaces, and a pouring gate so positioned that each unit part of the molten metal entering the mold will reach its ultimate resting place about the rail ends without substantially having previously come into contact with any other part of the rail ends.

In testimony whereof I affix my signature.

EDWARD F. BEGTRUP.